K. KOENMAN.
PROCESS OF TREATING WOOD.
APPLICATION FILED MAY 31, 1910.
987,888.
Patented Mar. 28, 1911.
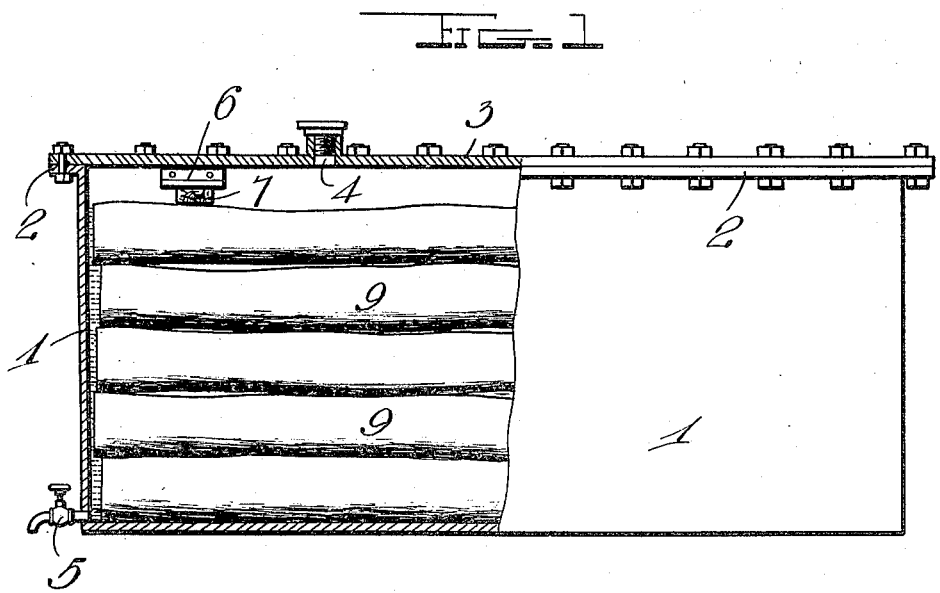
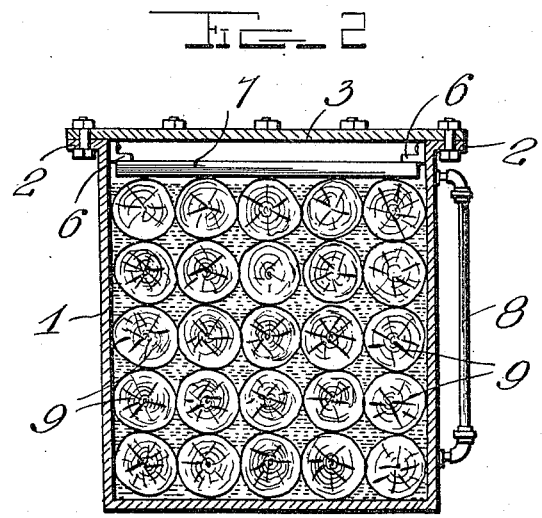
Witnesses
Inventor
Konstantin Koenman
by H. B. Willson & Co.
Attorneys

UNITED STATES PATENT OFFICE.

KONSTANTIN KOENMAN, OF NEW YORK, N. Y.

PROCESS OF TREATING WOOD.

987,888.  Specification of Letters Patent.  Patented Mar. 28, 1911.

Application filed May 31, 1910. Serial No. 564,287.

*To all whom it may concern:*

Be it known that I, KONSTANTIN KOENMAN, a subject of the Czar of Russia, residing at New York, in the county of New York and State of New York, have invented a certain new and useful Process of Treating Wood; and I do declare the following to be a full, clear, and exact description of the invention, such as will enable others skilled in the art to which it appertains to make and use the same.

This invention relates to the processes for treating wood whereby the strength and durability of the same is greatly increased.

In the annexed drawings I have shown in Figure 1 is a side elevation, partly broken away, of an apparatus which may be employed in the practice of my improved process, and in Fig. 2 I have shown a transverse vertical section of such apparatus.

In carrying out my invention the wood is subjected to a bath of ammonia water of greater or less strength, preferably of medium strength which will neutralize certain organic acids and decompose certain organic, albuminous, glutinous and other substances of the hardened sap and will in part decompose resinous substances. All of these substances which are decomposed pass into the water in a soluble state.

In order to properly apply the solution to the wood a suitable hermetically closed tank 1 is provided into which the wood is placed in such manner that the liquid will reach all surfaces of the wood and penetrate the same. The tank, in the form illustrated, is provided with a lateral flange 2 at its upper end upon which is secured a cover 3 having a small filling opening 4 through which the liquid is supplied thereto, said opening being tightly closed by a suitable stopper after the liquid is placed in the tank. A draw-off faucet 5 is also arranged near the bottom of the tank whereby the liquid may be drawn off when desired. On the inner walls of the tank, at or near the upper edges of the same, I provide lugs or stop brackets 6 under which are engaged the ends of transverse holding strips or bars 7. 8 designates a gage tube by which the level of the liquid within the tank may be noted at all times. The logs or sticks of wood 9 are placed in the tank so as to fill the same and their irregular contour will cause spaces to be left between them through which the liquid will reach all parts of the logs. One or more of the holding strips are placed across the tank under the stop lugs or brackets 6 to prevent the logs floating in the tank. The wood having been secured in the tank in the stated manner and the cover having been secured on the tank, I pour through the filling opening sufficient ammonia water to entirely cover the wood. The strength of the solution will vary according to the size and nature of the wood being treated and will ordinarily contain 22 to 24 per cent. of ammonia. If the wood is thin a 17 per cent. solution will serve, while for thick wood it may be necessary to use a 28 per cent. solution. The liquid will penetrate the wood and will be weakened through the chemical reaction and the water in the wood, so that a strong solution should be used if the wood is very moist or green.

As the liquid in the tank diminishes from absorption by the wood the quantity absorbed must be replenished from time to time in order to keep the wood completely covered at an equal depth. The depth of the liquid may be determined or measured either by the gage glass 8, or by inserting a small rod or other object into the filling opening or by a stop cock arranged at a suitable elevation in the side of the tank. After the liquid has been replenished and the depth thereof ascertained the filling opening should again be closed and kept closed until it becomes necessary to again replenish the liquid.

The first part of the process is completed when no more of the liquid will be absorbed by the wood and the depth of the liquid remains stationary. The time required for thus completing the first part of the process depends upon the kind of wood, and the size and thickness of the timbers under treatment and requires usually any where from three to sixteen days.

The next and most important or essential part of the process consists in washing out all of the substances which have been neutralized and decomposed in the wood by the solution and on the thoroughness of this washing depends the success of the process. In carrying out this washing operation the solution which has caused the neutralization and decomposition of the substances as hereinbefore described is drawn off through the faucet in the lower portion of the tank and the latter is then filled with water in which the wood must soak for two or three days after which this water is drawn off and the tank again filled with fresh water. This cleansing process must be repeated several times and the water changed once every day particularly if the timbers are not very thick. To ascertain when the wood is thoroughly cleansed a small quantity of the drawn off water is evaporated and if simply an unimportant sediment remains and only a faint odor is perceptible the wood may be considered as being clean. When the wood has thus been found to be thoroughly cleansed the same is taken from the tank and exposed to the air in the room and afterward dried in a kiln at a moderately high temperature about 100° C. or better and quicker in a suitable vacuum apparatus. It is during this drying of the wood that the contraction of the fibers takes place and they become more compact thus imparting to the wood a greater density, strength and elasticity which enables it to offer a great resistance to atmospheric influences and renders it much more durable than before the same has been subjected to this process. The process may be greatly expedited and the time required greatly reduced if the solution is applied to the wood under a pressure of 1½ atmospheres or by injection. From the foregoing description it will be seen that my process differs materially from other known processes of wood treatment in that I do not introduce foreign substances into the wood but on the contrary my process is made effective by the extraction of certain deleterious substances and by washing the wood whereby the same is made more durable. The solution of ammonia penetrates the entire bulk of the wood and decomposes all the deleterious substances in the same, and the subsequent washings with clear water frees the wood of the ammonia and decomposed matter. Inasmuch as the liquid reaches the innermost cells of the wood, the subsequent drying will not cause it to split or bend and during the drying the fibers will contract uniformly and increase the density of the wood. The finished product consequently will withstand dampness and changes in temperature and may be sawed into very thin boards without any fear of the same warping.

The chemicals employed in my process may be made to serve repeatedly in preparing the wood with little waste if the solution which has first been employed in decomposing the substances in the wood together with the water used in the first two or three washings is distilled with lime to separate matter extracted from the wood. From the residue of distillation acetic acid such as obtained in the distillation of wood and other organic acids is obtained.

My improved process is applicable to all kinds of wood and for all wooden objects such for instance as railway ties, mine timbers, building and boat timbers, furniture, etc., where great strength and durability are required.

Having thus described my invention what I claim is:

1. The process of treating wood which consists in saturating the wood with ammonia water, then withdrawing the ammonia water and soaking the wood in clear water until substantially all soluble matter is removed from the wood, and then drying the wood.

2. The process of treating wood which consists in saturating the wood with ammonia water while excluding air therefrom, then repeatedly soaking the wood in clear water until substantially all soluble matter is removed from the wood, and then finally drying the wood in a temperature of about 100° C.

In testimony whereof I have hereunto set my hand in presence of two subscribing witnesses.

KONSTANTIN KOENMAN.

Witnesses:
   JAS. FITZ GERALD,
   CONSTANTINO DE VIVO.